United States Patent [19]

Tsuchimoto et al.

[11] Patent Number: 4,697,615
[45] Date of Patent: Oct. 6, 1987

[54] BUTTERFLY VALVE FOR CONTROLLING HIGH-TEMPERATURE FLUID

[75] Inventors: Yoshihiro Tsuchimoto, Musashino; Kazuhiko Takesa, Yokosuka, both of Japan

[73] Assignees: Asahi Glass Company Ltd.; Nippon Kokan Kabushiki Kaisha, both of Tokyo, Japan

[21] Appl. No.: 729,230

[22] Filed: May 1, 1985

[51] Int. Cl.$^4$ ............................................. F16K 27/00
[52] U.S. Cl. .................................... 137/340; 137/334; 137/315; 137/375; 251/305
[58] Field of Search ............... 137/315, 334, 340, 375; 251/14, 305, 316, 368; 266/81, 187, 223, 266

[56] References Cited

U.S. PATENT DOCUMENTS

| 2,209,397 | 7/1940 | Gannestad . | |
|---|---|---|---|
| 2,902,254 | 9/1959 | Conway et al. | 137/375 |
| 3,406,903 | 10/1968 | Kidder | 251/305 X |
| 3,486,528 | 12/1969 | DeFrees | 251/14 |
| 3,734,134 | 5/1973 | Vogeli | 251/14 |
| 3,773,068 | 11/1973 | Vietorisz | 137/340 |
| 4,010,775 | 3/1977 | Roberts . | |
| 4,079,747 | 3/1978 | Roberts | 137/375 |
| 4,311,166 | 1/1982 | DeFeo | 137/375 |
| 4,380,246 | 4/1983 | Casale et al. | 137/340 |
| 4,588,168 | 5/1986 | Maillid et al. | 251/305 X |

FOREIGN PATENT DOCUMENTS

| 261711 | 6/1913 | Fed. Rep. of Germany . |
| 1049524 | 7/1956 | Fed. Rep. of Germany . |
| 2615041 | 7/1976 | Fed. Rep. of Germany . |
| 1557861 | 1/1968 | France . |
| 594839 | 1/1978 | Switzerland . |

Primary Examiner—A. Michael Chambers
Assistant Examiner—John C. Fox
Attorney, Agent, or Firm—Oblon, Fisher, Spivak, McClelland & Maier

[57] ABSTRACT

A butterfly valve for controlling high-temperature fluid including a ceramic valve is disclosed. The butterfly valve exhibits excellent high-temperature sealing and heat insulating characteristics and strength sufficient to rigid support the valve disc therein. The valve comprises a valve stem and a valve disc integrally formed of ceramics and is housed in a casing through a valve guide opening and the valve guide opening is closed with a plug through which the valve stem is inserted.

10 Claims, 2 Drawing Figures

BUTTERFLY VALVE FOR CONTROLLING HIGH-TEMPERATURE FLUID

BACKGROUND OF THE INVENTION

1. Field of the Invention

This invention relates to a butterfly valve for controlling high-temperature fluid, and more particularly to a butterfly valve for controlling high-temperature fluid which includes a ceramic valve.

2. Description of the Prior Art

In steel making, hot compressed air having a temperature as high as, for example, 1200° C. and a pressure as high as, for example, 3.5 kg/cm² (gage pressure) is fed to a blast furnace through number of tuyeres thereof at a high velocity of, for example, 200–250 m/sec. Also, the tuyeres provided at the blast furnace amounts to approximately thirty or more. Further, it is desired to control the flow of the compressed air of high temperature, high pressure and high velocity separately in each tuyere.

For this purpose, a valve structure using a metal valve was proposed and attempted. However, this valve was not put to practical use due to insufficient heat resistance. In order to eliminate such a problem, it was attempted to cool the metal valve with water. Unfortunately, however, this was not practical due to large heat loss. In view of the foregoing, it was proposed to have a valve made of a heat-resistant ceramic material for application to a butterfly valve which is of relatively simple structure.

A butterfly valve generally includes a valve which comprises a valve disc and a revolving valve stem, and the valve disc is rotatably supported within a fluid passage defined in a casing so that the fluid flowing through the fluid passage may be controlled by the rotation of the valve disc using the valve stem. The butterfly valve constructed as described above is assembled in such a manner that the valve disc is first arranged in the fluid passage of the casing, the valve stem is then inserted through a bore provided perpendicular to the flow direction of the fluid, and finally the valve disc and valve stem are connected together by means of bolts in the fluid passage of the casing.

However, when the valve disc and valve stem which are separately formed of a ceramic material are connected together in the fluid passage by bolts, it is required to provide both the ceramic valve disc and ceramic valve stem with boltholes. However, it is highly troublesome to provide the ceramic members with such holes, which cause the concentration of stress at portions of the ceramic members at which the holes are formed, and the ceramic members are liable to be damaged and/or broken. Also, ceramic bolts are generally difficult to obtain, and thus metallic bolts must be used instead of the ceramic bolts. This deteriorates excellent heat-resistant properties of the ceramic members. In a possible further alternative, it has been proposed to weld the ceramic valve disc and ceramic valve stem together in the fluid passage. However, as a matter of fact, the welding is impossible, because it requires a heat treatment at a high temperature.

In any case, it was conventionally highly difficult to have the ceramic valve disc and ceramic valve stem jointed in a narrow fluid passage so as to provide the valve with sufficient high-temperature strength. Thus, a butterfly valve using the ceramic valve has not yet been put into practical use.

In view of the foregoing, the inventors have proposed a butterfly valve which is constructed of a valve disc and a valve stem integrally formed of a ceramic material, and the valve thus formed is housed in a heat-resistant casing. This butterfly valve is satisfactory in heatresistance and high-temperature strength even when it is used to control the flow of fluid such as air of high temperature, high pressure and high velocity.

However, in the butterfly valve comprising the valve disc and valve stem which are integrally formed of ceramics, it is required to project the valve stem from the casing to connect the valve stem to a drive shaft when the valve is assembled in the casing. The casing is provided on the inside thereof with a heat insulating member formed of a refractory material, and the valve stem is supportedly inserted through a bore formed at the heat insulating member. Thus, the upright position of the valve stem in the casing is variable depending upon the working and assembling precision of the valve disc and heat insulating member. However, it is subtantially impossible to fabricate and assemble the valve disc formed of ceramics and the heat insulating member formed of refractory with substantially the same precision as those formed of metal, which results in the position at which the valve shaft is supported is considerably varied depending upon the working and assembling precision. This renders the precise axial alignment between the valve stem projecting from the casing and the driving shaft highly difficult. As a result, the valve stem is often rubbed against the wall of the bore of the heat insulating member and is worn and/or damaged due to the axial deviation occurring when the valve disc is rotated by the driving shaft.

The heat-resistant casing used for the conventional butterfly valve generally comprises a metal case and a heat insulating layer which is formed of refractory materials and lined on the inner surface of the metal case. As the refractory for heat insulating layer, castable refractory is generally used, which is formed into a single layer of a cylindrical shape and is applied to the inner surface of the metal case.

However, the conventional casing constructed as above is disadvantageous in that, when the interior of the casing is heated to an elevated temperature by hightemperature gas flowing therethrough, the inner and outer peripheries of the heat insulating layer are subjected to compression stress and tension stress due to heat expansion. As a result, a crack and the like is created at the heat insulating layer. In order to eliminate such a problem, it is proposed to use a heat insulating layer which is formed by combining a plurality of refractory pieces arcuate in section into a cylindrical shape. However, the heat insulating layer of this type permits heat to be transmitted to the metal case through joints between each two adjacent refractory pieces, from the fluid passage to the inner surface of the metal case, resulting in damage of the metal case and/or leakage of high-temperature gas from the casing.

Further, although the heat insulating layer applied to the metal case of the butterfly valve for controlling high-temperature fluid is required to have enough strength and heat-resistance sufficient to support the valve rigidity in a fluid stream of high temperature and high pressure, there is a general tendency that refractory having high strength is inferior in heat-resistance, whereas refractory of enough heat-resistance is low in strength.

SUMMARY OF THE INVENTION

The present invention has been made in view of the foregoing disadvantages of the prior art.

Accordingly, it is an object of the present invention to provide a butterfly valve for controlling high-temperature fluid which is capable of controlling the flow of compressed gas of high temperature and high pressure, facilitating the assembling of the valve, sealing high-temperature gas satisfactorily and exhibiting excellent heat insulating effects.

It is another object of the present invention to provide a butterfly valve for controlling high-temperature fluid which is capable of controlling the flow of compressed gas of high temperature and high pressure, exhibiting excellent gas sealing and heat insulating effects, and supporting a valve with sufficient strength in a gas stream.

It is a further object of the present invention to provide a butterfly valve for controlling high-temperature fluid which is capable of effectively preventing the wear and/or damage of a ceramic valve stem even if there is axial deviation between the valve stem and a drive shaft.

In accordance with the present invention, there is provided a butterfly valve for controlling hightemperature fluid. The butterfly valve includes a casing having a fluid passage defined therein and a ceramic valve rotatably arranged in the fluid passage. The valve consists of a valve disc and a valve stem which are integrally formed together. A valve guide opening is provided extending from the outside of the casing to the fluid passage, which allows the valve to introduce into the fluid passage. The valve guide opening is closed by a plug which permits the valve stem to pass therethrough and rotatably supports the valve stem.

In the present invention, the valve stem, which is the integral part of the valve, is projected from the casing so as to be connected to a drive shaft by means of a universal joint. Also, the casing includes a metal outer case and a heat insulating inner layer made of an layer formed of refractory having excellent heat insulating properties and an layer formed of high-strength refractory. The plug and inner layer cooperate to define stop means for limiting movement of the plug into the inner layer, whereby the plug and the valve are together insertable and removable as a single unit.---.

According to the present invention, the connection between the valve disc and valve stem can be eliminated and the valve has sufficient strength to withstand the stream of high-temperature fluid, because the valve disc and valve stem are integrally formed. Also, although the integral formation of the valve disc and valve stem makes it difficult to accomodate the valve in a conventional valve casing, the provision of the valve guide opening through which the valve stem is inserted and which is closed with the plug permits the valve to be introduced into the casing. Thus, the assembling and removing of the valve with respect to the casing can be readily carried out by merely detaching the plug from the valve guide opening. Further, the contact area of the plug and the peripheral wall of the valve guide opening is a relatively small. Thus, the leakage of high-temperature gas and heat to the outside of the casing is effectively prevented.

In a preferred embodiment of the present invention, the peripheral wall of the valve guide opening is tapered off toward the fluid passage and the plug is formed into a shape corresponding to that of the valve guide opening. Therefore, the axis of the valve stem can be more precisely positioned with respect to the casing and the plug and the peripheral wall of the valve guide opening can be contacted more tightly. Furthermore, it is preferable to provide inner periphery of an axle bore of the plug through which the valve stem is inserted with a bush made of high strength ceramics. The bush is more preferably provided at the axle bore of the plug which is adjacent to the fluid passage. The bush reinforces the inner periphery of the axle bore of the plug which is subjected to pressure of a hihg-temperature gas stream applied to the valve disc, and increases the durability of the plug. It is also preferable to interpose sealing member formed of ceramic fiber between the peripheral wall of the valve guide opening and the plug so that any gap between the peripheral wall of the valve guide opening and the plug may be completely sealed so as to prevent the leakage of high-temperature gas and increase the heat insulation property of the valve.

According to the present invention, the valve stem is connected to a drive shaft by means of a universal joint. Accordingly, the valve stem can be smoothly rotated even if there is axial deviation between the valve stem and the drive shaft due to the variation in mounting position of the valve stem occurring when the valve is assembled in the casing. Thus, the wear and/or damage of the valve stem can be effectively prevented, thereby to improve the durability of the valve.

It is to be understood, however, that the valve stem is not necessarily connected directly to the drive shaft by means of the universal joint. For example, the valve stem may be connected to the drive shaft in such a manner that the valve stem is connected through a coupler to an intermediate shaft and then the intermediate shaft is connected to the drive shaft by means of the universal joint. In this instance, the valve stem can be significantly shortened, to thereby substantially reduce stress applied to the ceramic valve stem.

Also, in the present invention, the heat insulating layer of the casing comprises a first layer formed of high-strength refractory and a second layer formed of refractory having excellent heat insulating properties. Thus, the heat insulating layer can exhibit excellent load-bearing and heat insulating properties, because the first layer of high strength rigidly withstands force of high-temperature gas flowing under high pressure which is applied to the valve disc and the second layer effectively shields heat. The heat insulating layer of such double-layer construction prevents the joints of the inner layer from straightly extending to the inner surface of the metal case, to thereby effectively prevent the leakage of high-temperature gas and heat to the metal case.

Furthermore, in the present invention, the first heat insulating layer is formed by combining a plurality of precast refractory pieces together and the second layer is preferably formed by casting castable refractory in a gap between the metal case and the first layer arranged in the metal case. Thus, the generation of crack and damage of the heat insulating layer can be prevented, because the first layer formed of the divided pieces effectively absorbs stress applied to the inner layer due to heat expansion and stress applied to the valve. Furthermore, the second layer is integrally formed into a cylindrical shape, which is effective to shield high temperature gas and heat and to have the first and second layers contacted tightly.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate the same parts throughout; wherein.

DETAILED DESCRIPTION OF THE PREFERRED EMBODIMENTS

Now, a butterfly valve for controlling high-temperature fluid according to the present invention will be described hereinafter with reference to the accompanying drawings.

Figure 1:
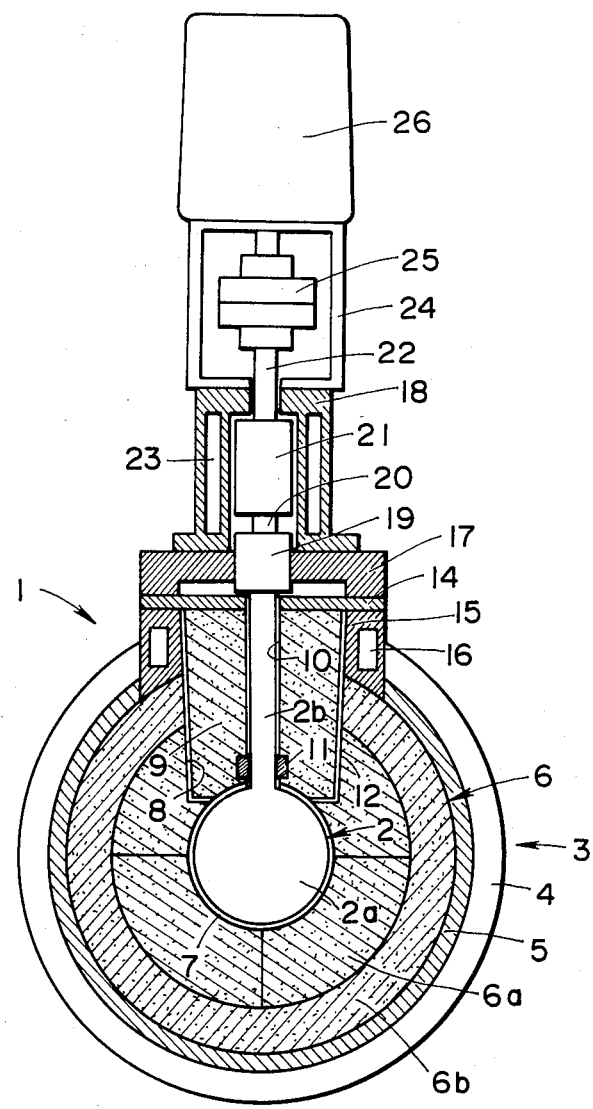
FIG. 1 is a vertical sectional front view showing an embodiment of a butterfly valve for controlling hightemperature fluid according to the present invention.
Figure 2:
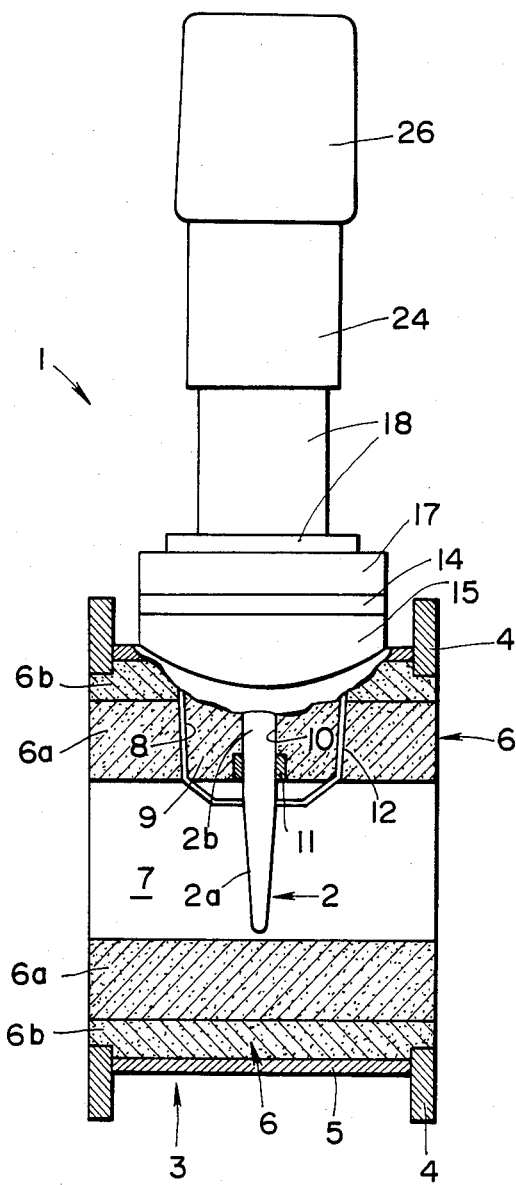
FIG. 2 is a vertical sectional side view of the butterfly valve shown in FIG. 1.

Referring to FIGS. 1 and 2 showing an embodiment of a butterfly valve according to the present invention, a butterfly valve of the illustrated embodiment generally designated by reference numeral 1 includes a valve 2 and a casing 3 for accomodating the valve 2 therein. The valve 2 comprises a valve disc 2a and a valve stem 2b which are integrally formed of ceramics. The casing 3 comprises a metal outer case 5 having a pair of flanges 4 provided at the edges of openings thereof and a heat insulating inner layer 6 formed of refractory and lined on the inner surface of the metal case 5. The casing 3 has a fluid passage 7 defined therein. The casing 3 is provided with a valve guide opening 8 which extends from the outer peripheral portion of the casing 3 to the fluid passage 7 for introducing the valve 2 into the fluid passage 7. The valve guide opening 8 is inserted or fitted therein a plug 9. The plug 9 is provided with an axle bore 10, through which the valve stem 2b is inserted in the plug 9. The axle bore 10 is provided with a bush 11 at the end thereof communicated with the fluid passage 7. In the illustrated embodiment, the plug 9 is formed of heatinsulating refractory and the bush 11 is formed of high-strength ceramics, such as, for example, silicon carbide, silicon nitride or the like. The plug 9 is tapered off toward the fluid passage 7 and is generally formed into an inverted frusto-conical shape. The valve guide opening 8 has a width sufficient to allow the valve disc 2a to be passed therethrough.

The butterfly valve 1 also includes a sealing member 12 which is formed of any suitable materials, such as, for example, ceramic fiber or the like and interposed between the plug 9 and the peripheral wall of the opening 8. The plug 9 is mounted on a metal flange 14 by means of an anchor bolt (not shown), and the metal flange 14 is clamped at the outer periphery thereof with respect to a cylinder 15 and a ring 17 by means of a bolt (not shown). The cylinder 15 is welded at one end thereof to the metal case 5. Accordingly, the plug 9 is fixed through the metal flange 14 and cylinder 15 to the casing 3. The cylinder 15 is provided on the outer periphery thereof with a water-cooling jacket 16. Reference numeral 18 designates a cylindrical case having a flange formed at the lower end thereof, which is fixed to the ring 17 by means of a bolt (not shown). The valve stem 2b extends outwardly projecting from the metal flange 14 through the axle bore 10 of the plug 9 and is connected to an intermediate shaft 20 by means of a coupler 19. The intermediate shaft 20 is then connected to a shaft 22 by means of a universal joint 21 arranged in the cylindrical case 18. Also, the cylindrical case 18 is provided on the outer periphery thereof with a water-cooling jacket 23, and a frame 24 is mounted on the other end of the cylindrical case 18. The shaft 22 is connected through a coupler 25 provided in the frame 24 to a driving shaft of a motor 26.

In the illustrated embodiment, the heat insulating inner layer 6 of the casing 3 comprises a first layer 6a formed of high-strength refractory and a second layer 6b formed of refractory having high heat-insulating properties. The first layer 6a is made of refractory having compression strength of preferably 3 kgf/mm$^2$ or more preferably 6 kgf/mm$^2$ or more, such as, for example, high-quality chamotte castable refractory, high alumina refractory or the like. The first layer 6a, in the illustrated embodiment, is formed of four pieces of precast refractory of an arcuate shape in section which are combined together to form a cylindrical shape. The second layer 6b is formed of refractory having thermal conductivity of preferably 0.5 kcal/m/hr/°C. or less and more particularly 0.3 kcal/m/hr/°C. or less, such as, for example, vermiculite castable refractory, chamotte castable refractory or the like. The second layer 6b is formed by first arranging the second layer 6b in the metal case 5 so that a gap of a suitable interval may be formed therebetween and then casting castable refractory in the gap.

Now, the manner of operation and assembling of the butterfly valve of the illustrated embodiment constructed as described above will be described with reference to the drawings.

First, when the drive shaft is rotated by the actuation of the motor 26, the valve stem 2b is rotated through the coupler 25, shaft 22, universal joint 21, intermediate shaft 20 and coupler 19. Then, the valve plate 2a may be varied in angle within the fluid passage 7 for controlling the flow of fluid. In this instance, the upright position of the valve stem 2b is variable depending upon the degree of working precision of the valve guide opening 8 provided at the heat insulating layer 6, the degree of working precision of the plug 9 and a combination thereof. Also, the valve stem 2b is connected through various couplers to the drive shaft of the motor 26. Thus, it would be highly difficult to precisely align the axis of the valve stem with that of the drive shaft. However, in the illustrated embodiment, because the connection between the valve stem 2b and the drive shaft of the motor 26 is effected using the universal joint 21, it is possible to smoothly rotate the valve stem 2b and to effectively prevent the wear and/or damage of the valve stem 2b even if there is axial deviation therebetween. Also, the valve 2 is integrally formed of ceramics and the casing 3 is provided on the inside thereof with the heat insulating layer 6. Thus, the valve positively ensures the heat resistance and heat insulation although high-temperature gas flows through the fluid passage 7. Further, in the illustrated embodiment, the plug 9 is tapered off toward the fluid passage 7 so as to be an inverted frust-conical in shape, and is arranged within the valve guide opening 8 so that it may tightly contact with the peripheral wall of the guide path 8 through the sealing member 12. Accordingly, the leakage of high-temperature gas and leakage of heat to the outside of the casing due to conduction are effectively prevented.

Also, the axis of the valve stem 2b can be precisely determined due to the centering effect of the plug 9. In this instance, the valve 2 is subjected to pressure of a high-temperature gas stream, which is, in turn, shifted through the plug 9 in which the valve stem 2b is supported to the first layer 6a of the heat insulating layer 6. However, the valve of the illustrated embodiment rigidly and stably supports the valve stem 2b therein irrespective of application of the pressure to the first layer 6a, because the first layer 6a is formed of highstrength refractory. Also, the first layer 6a is divided into four sections. This effectively prevents crack, breakage and the like from occurring in the first layer 6a irrespective of the generation of stress due to heat expansion under the conditions of a high temperature. Further, the first layer 6a is surrounded at the overall second periphery thereof with the outer layer 6b integrally formed into a cylindrical shape. Thus, the joint between each adjacent two refractory pieces in the first layer 6a is closed with the second layer 6b, to thereby prevent the leakage of high-temperature gas and the discharge of heat to the outside through the joint.

Furthermore, the second layer 6b is formed of refractory having excellent heat insulating properties, resulting in the valve being provided with sufficient heat insulation. For example, when the casing 3 is assembled by arranging the outer layer 6a which has dimensions of 0.5 m in outer diameter and 0.4 m in inner diameter and heat conductivity of 0.2 kcal/m/hr/°C. on the inside of the metal case 5 made of iron steel having dimensions of 0.52 m in outer diameter and 0.5 m in inner diameter and an emissivity of 0.79 and then arranging the inner layer component 6a which has dimensions of 0.4 m in outer diameter and 0.2 m in inner diameter, compression strength of 9.5 kgf/mm², and heat conductivity of 1.0 kcal/m/hr/°C. on the inside of the second layer 6b according to the illustrated embodiment, and high-temperature gas having a temperature of 1200° C. flows through the fluid passage 7 within the casing 3, the outer surface of the casing 3 theoretically reaches at most about 190° C. Thus, it will be noted that the butterfly valve of the present invention, in spite of relatively small in size, exhibits excellent heat resistance and heat insulation without using any specific material and requiring water cooling.

When assembling the valve, the arrangement of the valve 2 in the casing 3 is carried out by inserting the valve stem 2b of the valve 2 via the axle bore 10 of the plug 9, and disposing the valve disc 2a in the fluid passage 7 through the valve guide opening 8 and securely inserting the plug 9 held on the valve in the valve guide opening 8. At that time, the sealing member 12 is interposed between the plug 9 and the peripheral wall of the valve guide opening 8. Then, the metal flange 14 is fixedly mounted on the outer end surface of the plug 9 by means of an anchor bolt. Thereafter, the ring 17 is fixed on the cylinder 15 together with the metal flange 14 by means of a bolt and then the cylindrical case 18 is securely mounted on the ring 17 by means of a bolt. Finally, the shaft 22 is connected through the coupler 25 to the drive shaft of the motor 26.

The removal of the valve 2 from the casing 3 is carried out in the following manner.

First, the coupler 25 is loosened to disconnect the cylindrical case 18 from the ring 17 and remove the motor 26, frame 24 and cylindrical case 18 all together therefrom. Then, the bolt is loosened to remove the ring 17 from the cylinder 15. Thereafter, the valve 2, plug 9, metal flange 14, coupler 19, shaft 20, universal joint 21 and shaft 22 are integrally drawn away from the casing 3, to thereby remove the valve 2 from the casing.

In the illustrated embodiment, the plug 9 is preferably to have a circular shape in cross section for improving accuracy in the manufacturing of the valve. However, the present invention is not limited to such configuration of the plug. For example, the plug may be formed into, for example, a rectangular shape in section which has a longitudinal side larger than the diameter of the valve plate 2a. In this instance, the valve guide opening 8 is formed to have a configuration corresponding to the plug. Further, the plug is made of refractory having compression strength of preferably 3 kfg/mm² or more and more preferably 6 kgf/mm² or more. The second layer 6b of the heat insulating layer 6 as well as the first layer 6a may be formed by combining several refractory pieces into a cylindrical shape. In this instance, the second and first layers are arranged to prevent the joints of both components from aligning with one another, to thereby ensure the high-temperature gas and heat sealing characteristics of the valve.

While a preferred embodiment of the invention has been described with a certain degree of particularity, obvious modifications and variations are possible in light of the above teachings. It is therefore to be understood that within the scope of the appended claims, the invention may be practiced otherwise than as specifically described.

What is claimed as new and desired to be secured by Letters Patent of the United States is:

1. A butterfly valve for controlling high temperature fluid comprising:
    a casing having a fluid passage defined therein, said casing having at least one refractory inner layer;
    a valve formed of ceramics and rotatably arranged in said fluid passage, said valve including a valve disc and a valve stem which are unitarily formed;
    a valve guide opening extending from the outside of said casing and through said inner layer to said fluid passage, said valve guide opening having means for permitting said valve to be received through said inner layer and into said fluid passage; and
    a plug for inserting said valve stem, said plug being arranged to sealingly close said valve guide opening in said inner layer and rotatably support said valve stem, said plug and said inner layer cooperating to define stop means for limiting movement of said plug into said inner layer, whereby said plug and said valve are together insertable and removable as a single uint.

2. A butterfly valve for controlling high-temperature fluid as defined in claim 1, wherein said valve guide opening is inward tapered off to cause the sectional area of said valve guide opening to be gradually decreased in the inward direction and said plug is tapered off to correspond to the shape of said valve guide opening.

3. A butterfly valve for controlling high-température fluid as defined in claim 1 or 2, wherein said plug is provided with an axle bore through which said valve stem is inserted in said plug, said axle bore of said plug being provided with a bush of high-strength ceramics to be fitted therein.

4. A butterfly valve for controlling high-temperature fluid as defined in claim 3 further comprising a sealing member which is formed of ceramic fiber and interposed between the peripheral wall of said valve guide opening and said plug.

5. A butterfly valve for controlling high-temperature fluid as defined in claim 1 or 2 further comprising a sealing member which is formed of ceramic fiber and interposed between the peripheral wall of said valve guide opening and said plug.

6. The butterfly valve of claim 1 wherein said valve stem projects from said casing, including:
   a drive shaft for operating said valve; and
   a universal joint for connecting said valve stem to said drive shaft.

7. A butterfly valve for controlling high-temperature fluid as defined in claim 6 further comprising an intermediate shaft connected to said valve stem, said intermediate shaft being connected to said universal joint.

8. The butterfly valve of claim 6 wherein said valve stem projects from said casing, including:
   a drive shaft for operating said valve; and
   a universal joint for connecting said valve stem to said drive shaft.

9. The butterfly valve of claim 1 wherein said casing comprises:
   an outer metal case; and
   a heat insulating layer comprising said at least one refractory inner layer and provided on the inside of said metal case, wherein said heat insulating layer comprises:
   a. a first layer formed of high strength refractory material, and
   b. a second layer outside said first layer and formed of refractory material having excellent heat insulating properties.

10. A butterfly valve for controlling high-temperature fluid as defined in claim 9, wherein said first layer is formed by combining precast refractory pieces and said second layer is formed of casting castable refractory between said casing and said first layer arranged in said casing.

* * * * *